Jan. 30, 1968  M. G. LEMOINE  3,366,872
VOLTAGE REGULATOR

Filed Oct. 29, 1964  2 Sheets-Sheet 1

INVENTOR.
MAURICE G. LEMOINE
BY
*Flehr and Swain*
ATTORNEYS

United States Patent Office 3,366,872
Patented Jan. 30, 1968

3,366,872
VOLTAGE REGULATOR
Maurice G. Lemoine, Redwood City, Calif., assignor, by mesne assignments, to International Telephone and Telegraph Corporation, New York, N.Y., a corporation of Maryland
Filed Oct. 29, 1964, Ser. No. 407,365
2 Claims. (Cl. 323—22)

ABSTRACT OF THE DISCLOSURE

A voltage regulator is provided including a gate in series with an unregulated supply. A first free running multivibrator having a fifty percent duty cycle gates out the unregulated voltage during the first half of each period of the first multivibrator. The first multivibrator triggers a second monostable multivibrator. The second then gates out the unregulated voltage for an additional length of time. The said additional length of time is variable and is determined by a feedback circuit connected from the output of the regulator.

---

Figure 1:
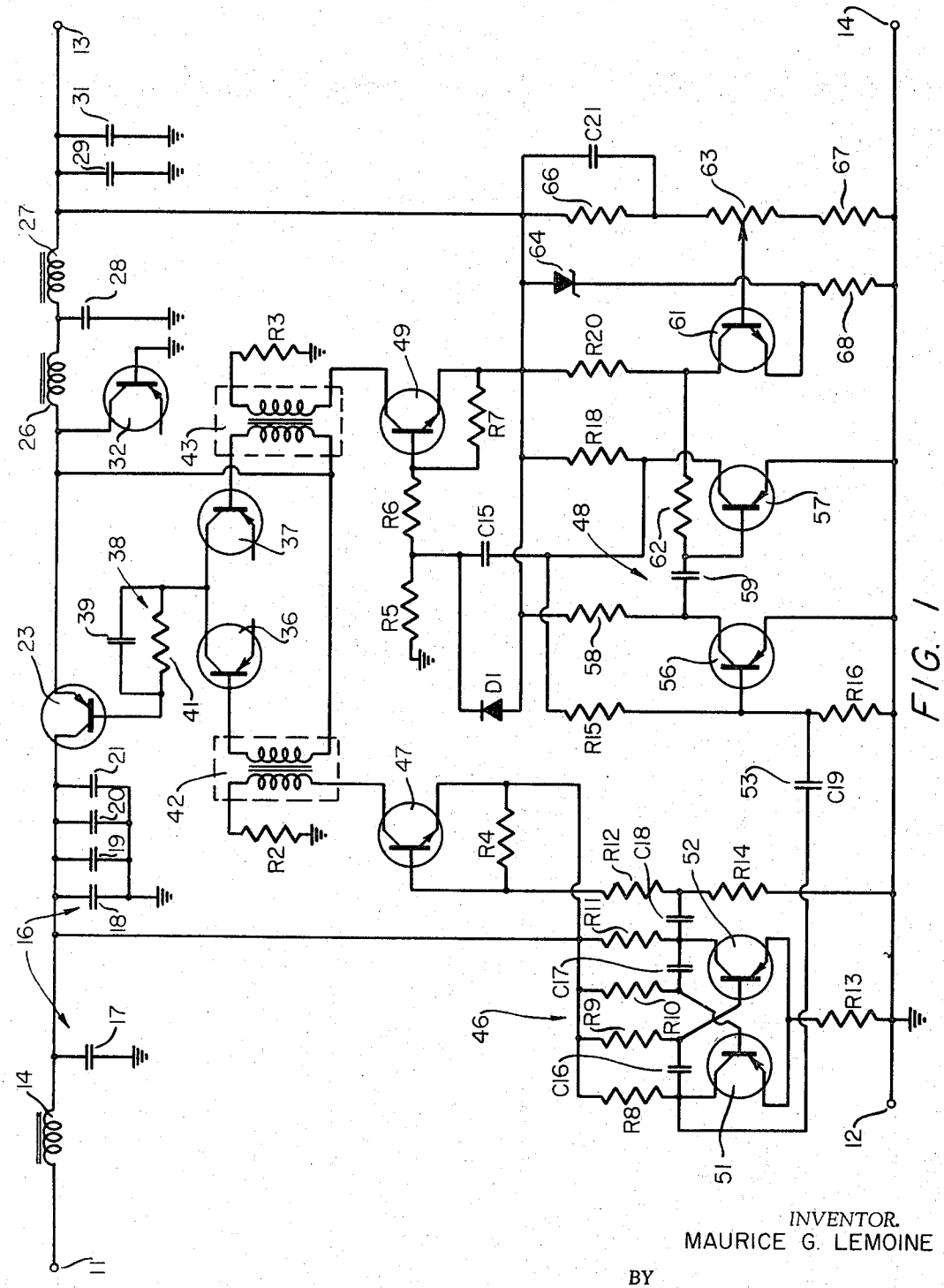

This invention relates generally to a D-C voltage regulator and more particularly to a low loss D-C voltage regulator.

It is a general object of the present invention to provide an improved D-C voltage regulator.

It is a further object of the present invention to provide a voltage regulator which has relatively low losses.

It is still a further object of the present invention to provide a voltage regulator employing a switching transistor which is switched from fully off to fully on with the on cycle being controlled to control the output voltage.

It is still a further object of the present invention to provide a voltage regulator of the foregoing type which is simple in construction and reliable in operation.

The foregoing and other objects of the invention will become more clearly apparent from the following description taken in conjunction with the accompanying drawings.

Figure 2:
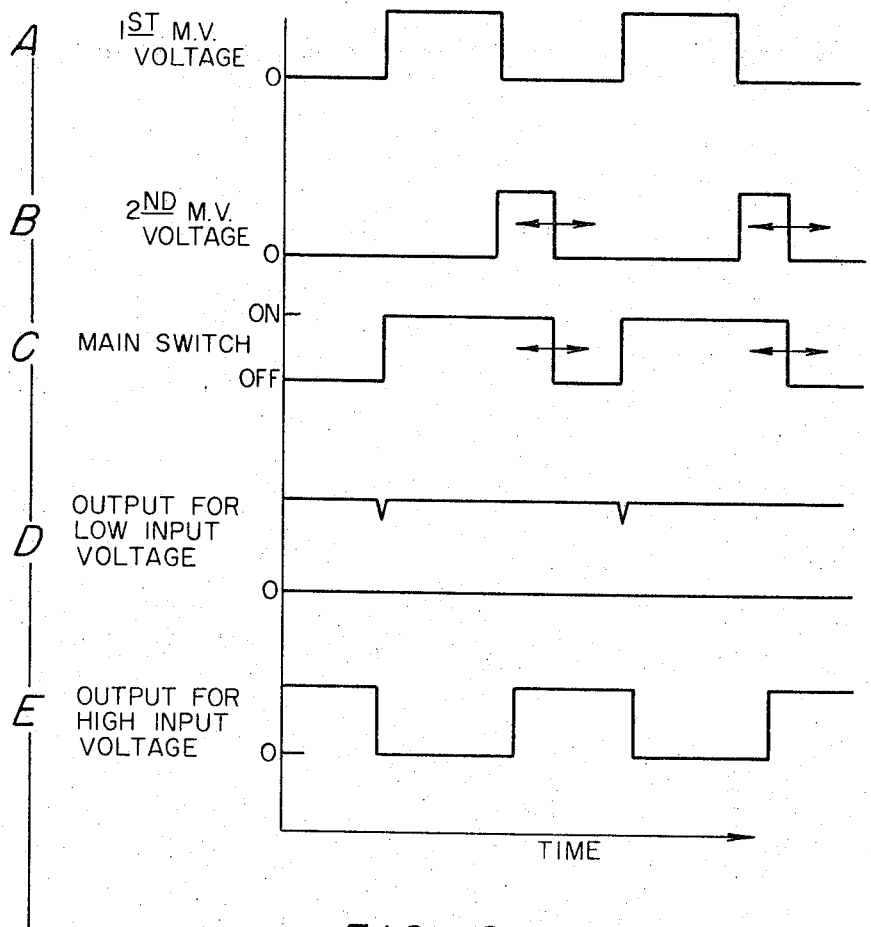

Referring to the drawings:

FIGURE 1 is a schematic circuit diagram of a regulator in accordance with the present invention; and FIGURE 2 shows the waveform at various parts of the circuit of FIGURE 1.

Generally, the circuit shown includes a switching transistor whose on period is controlled by a pair of multivibrators. One of the multivibrators is a free running multivibrator which switches the transistor on and off for a 50 percent duty cycle. This multivibrator also serves to trigger a second multivibrator. The second multivibrator is a one-shot variable pulse length multivibrator with the pulse length controlled by the voltage output of a comparison circuit which compares the filtered output voltage with a reference voltage and serves to vary the duty cycle to thereby control the output voltage.

Referring more particularly to FIGURE 1, there is shown a circuit having a pair of input terminals 11 and 12 and a pair of output terminals 13 and 14. The raw input voltage is applied between the input terminals 11 and 12, and the regulated output voltage is available at the output terminals 13 and 14. An input filter comprising a series inductor 14 and parallel capacitance 16, made up of a plurality of capacitors 17, 18, 19, 20 and 21, serves to isolate the switching transistor 23 from the voltage supply whereby any transients caused by switching of the series switching transistor 23 do not affect the supply.

The output of the transistor 23 is applied to a two-section filter including inductors 26 and 27 and parallel capaictors 28, 29 and 31. The transistor 32 is used as a diode by leaving its emitter floating. The diode serves to supply current to the inductor when the transistor is switched off.

The series switching transistor 23 is driven to saturation by causing either of the transistors 36 or 37, connected as diodes, to be switched on by applying saturation voltage to the base through the network 38 including capacitor 39 and resistor 41. The diodes 36 and 37 are switched through the transformers 42 and 43, respectively. The input to the primary of the transformer 42 is from a multivibrator 46 through an amplifying stage 47, while the input to the transformer 43 is from a multivibrator 48 through an amplifying stage 49.

The multivibrator 46 is connected as a free-running multivibrator whereby it operates at a predetermined frequency determined by the coupling networks between the collectors and bases of the transistors 51 and 52. Operation of a circuit of this type is well known and is not described in detail.

The output from the transistor 52 is amplified by the amplifier including transistor 47 and associated circuitry, and applied to the primary of transformer 42 to turn on the diode 36.

The output from the transistor 51 is capacitively coupled by capacitor 53 to trigger on the multivibrator 48 which includes the transistors 56 and 57 and associated circuitry. The multivibrator 48 is connected as a one-shot multivibrator which is triggered on by a pulse from the transistor 51 and remains on a time which is determined by the coupling network, including resistor 58 and capacitor 59, connected between the collector of transistor 56 and the base of transistor 57. The charge on the capacitor 59 is additionally controlled by the output from the transistor 61 through the resistor 62.

The transistor 61 has its input derived from the potentiometer 63 and Zener diode 64. It is observed then that a predetermined voltage is applied to the emitter while the voltage applied to the base is the output volage divided by the voltage divider comprising resistors 66 and 67 and the potentiometer 63. Thus, the emitter-base voltage of transistor 61 is the difference between the voltage derived from the constant voltage source including the Zener diode 64 and resistor 68 and the variable output voltage. The output of this transistor serves to control the charge on the capacitor 59 and, therefore, controls the on period of the multivibrator 48.

During the on period of the multivibrator 48, the output from the collector of the transistor 57 is applied through the amplifier circuit including transistor 49 to the primary of the transformer 43 and switches on the diode 37 which turns on the transistor 23.

Operation of the circuit is more clearly understood with reference to FIGURE 2. In FIGURE 2A, the voltage of the first multivibrator is shown as a squarewave voltage having a 50 percent duty cycle. The output of the second multivibrator is shown at FIGURE 2B. The multivibrator is triggered on at the termination of the pulse from the first multivibrator. The trailing edge of the output pulse from this multivibrator is shown as having a variable time delay. FIGURE 2C shows the on-off condition of the transistor 23 responsive to the signals of FIGURES 2A and 2B. FIGURE 2D shows the output waveform of transistor 23 for a low input voltage, and FIGURE 2E shows the output of the switching transistor for a high input voltage. It is, of course, to be understood that the voltage appearing at the output terminal 13 will be a substantially constant D-C voltage having a very low ripple content due to the filtering.

A voltage regulator was constructed as shown in FIGURE 1 with the values of the components as follows.

Diodes:
 D1—SC2
 64—IN958A

Transistors:
| | |
|---|---|
| 23—2N1907 | 51—2N404A |
| 32—2N1907 | 52—2N404A |
| 36—2N1907 | 56—2N404A |
| 37—2N1907 | 57—2N404A |
| 47—2N2270 | 61—2N2270 |
| 49—2N2270 | |

Capacitors:
| | |
|---|---|
| 17—47 µf. | 39—.1 µf. |
| 18—47 µf. | 59—.0015 µf. |
| 19—47 µf. | C15—2.2 µf. |
| 20—47 µf. | C16—.0015 µf. |
| 21—47 µf. | C17—.0015 µf. |
| 28—.82 µf. | C18—.1 µf. |
| 29—47 µf. | C19—560 µµf. |
| 31—47 µf. | C21—.01 µf. |

Resistors:
| | |
|---|---|
| 41—5.1Ω | R7—2700Ω |
| 58—3900Ω | R8—2700Ω |
| 62—3300Ω | R9—27KΩ |
| 63—1KΩ | R10—27KΩ |
| 66—4.53KΩ | R11—2700Ω |
| 67—6.98KΩ | R12—8200Ω |
| 68—3300Ω | R13—2.2KΩ |
| R2—560Ω | R14—56KΩ |
| R3—560Ω | R15—27KΩ |
| R4—2700Ω | R16—27KΩ |
| R5—56KΩ | R18—2200Ω |
| R6—1500Ω | |

The foregoing circuit was operated. With the input voltage varying between 20.6 and 32 volts and the load varying from .2 amp to 1 amp, the output voltage remained at 20 volts ±1 percent. The efficiency varied when the input voltage was at its minimum. between 87% and 93%, with the 93% efficiency obtained Thus, it is seen that there is provided an improved voltage regulator having good regulation and efficiency.

I claim:

1. In a voltage regulator, the combination comprising: a gate for connection from an unregulated source; first means including a free running multivibrator to open said gate periodically for a first predetermined time interval; second means including a monostable multivibrator responsive to said free running multivibrator to open said gate for a second variable time interval subsequent to each first time interval; and a feedback circuit responsive to the output of said gate for controlling said monostable multivibrator in a manner to vary the said second time interval inversely with the output of said gate.

2. The invention as defined in claim 1, wherein said feedback circuit includes a low pass filter connected from the output side of said gate, a voltage divider connected from the output of said filter, a transistor having a base and a collector-emitter circuit, the output of said voltage divider being connected to said base, a Zener diode connected from said filter to said emitter, a resistor connected from said filter to said collector, said monostable multivibrator having a coupling capacitor, and means connected from said collector to vary the charge on said capacitor in a manner to cause each second time interval to be inversely proportional to the output voltage of said filter.

References Cited

UNITED STATES PATENTS

| | | | |
|---|---|---|---|
| 3,305,767 | 2/1967 | Beihl et al. | 323—22 |
| 3,303,416 | 2/1967 | Paice et al. | 323—22 |
| 3,290,583 | 12/1966 | Sinclair | 323—22 |
| 3,152,451 | 10/1964 | Downs | 62—3 |

JOHN F. COUCH, *Primary Examiner.*

M. WACHTELL, *Assistant Examiner.*